United States Patent
Pan et al.

(10) Patent No.: US 7,739,476 B2
(45) Date of Patent: Jun. 15, 2010

(54) R AND C BIT UPDATE HANDLING

(75) Inventors: Jesse Pan, San Jose, CA (US); Ramesh Gunna, San Jose, CA (US)

(73) Assignee: Apple Inc., Cupertino, CA (US)

( * ) Notice: Subject to any disclaimer, the term of this patent is extended or adjusted under 35 U.S.C. 154(b) by 334 days.

(21) Appl. No.: 11/267,711

(22) Filed: Nov. 4, 2005

(65) Prior Publication Data

US 2007/0106874 A1    May 10, 2007

(51) Int. Cl.
*G06F 12/00* (2006.01)
*G06F 12/10* (2006.01)
*G06F 15/16* (2006.01)
*G06F 15/177* (2006.01)

(52) U.S. Cl. ............ 711/206; 711/156; 711/203; 711/204; 711/205; 711/207; 711/208

(58) Field of Classification Search ......... 711/203–208, 711/156
See application file for complete search history.

(56) References Cited

U.S. PATENT DOCUMENTS

| 5,437,017 | A | * | 7/1995 | Moore et al. ............... 709/213 |
| 5,758,120 | A | | 5/1998 | Kahle et al. |
| 5,785,120 | A | | 7/1998 | Smalley et al. ............ 166/55 |
| 6,119,204 | A | | 9/2000 | Chang et al. |
| 6,260,131 | B1 | * | 7/2001 | Kikuta et al. ............. 711/210 |
| 6,286,092 | B1 | * | 9/2001 | Frank et al. .............. 711/207 |
| 6,651,156 | B1 | * | 11/2003 | Courtright et al. ......... 711/207 |
| 6,684,305 | B1 | * | 1/2004 | Deneau .................... 711/159 |
| 7,073,043 | B2 | | 7/2006 | Arimilli et al. |
| 2007/0061548 | A1 | * | 3/2007 | Jordan et al. ............. 711/207 |

* cited by examiner

*Primary Examiner*—Sanjiv Shah
*Assistant Examiner*—Samuel Dillon
(74) *Attorney, Agent, or Firm*—Lawrence J. Merkel; Meyertons, Hood, Kivlin, Kowert & Goetzel, P.C.

(57) ABSTRACT

In one embodiment, a processor comprises a memory management unit (MMU) and an interface unit coupled to the MMU and to an interface unit of the processor. The MMU comprises a queue configured to store pending hardware-generated page table entry (PTE) updates. The interface unit is configured to receive a synchronization operation on the interface that is defined to cause the pending hardware-generated PTE updates, if any, to be written to memory. The MMU is configured to accept a subsequent hardware-generated PTE update generated subsequent to receiving the synchronization operation even if the synchronization operation has not completed on the interface. In some embodiments, the MMU may accept the subsequent PTE update responsive to transmitting the pending PTE updates from the queue. In other embodiments, the pending PTE updates may be identified in the queue and subsequent updates may be received.

21 Claims, 6 Drawing Sheets

R AND C BIT UPDATE HANDLING

BACKGROUND

1. Field of the Invention

This invention is related to the field of processors and, more particularly, to reference and change bit updates to page table entries in processors.

2. Description of the Related Art

Processors typically implement address translation. When address translation is enabled, fetch addresses and load/store addresses are effective or virtual addresses. The effective/virtual address is translated through the address translation mechanism to arrive at a physical address (or real address). The terms physical address and real address, as used herein, are intended to be synonymous. The physical/real address is the address actually used to address memory. For example, the PowerPC™ instruction set architecture defines an effective address that is translated through a segment mechanism to a virtual address, and the virtual address is translated through a page table to a physical/real address. An effective address is the address generated to fetch the instruction (also referred to as the program counter, or PC, of the instruction) or the address generated from the address operands of a load/store instruction. The PC is often generated by adding an offset to the current PC depending on whether a sequential or branch target fetch is being generated. In some cases, the effective address is equal to the virtual address. In other cases, the virtual address is generated based on the effective address (e.g. translated from the effective address, or generated by applying some predetermined operation on the effective address).

Address translation is used for a variety of reasons. For example, address translation can be used to provide a larger effective or virtual address space than the amount of physical memory included in the computer system could support. A slower secondary storage (e.g. disk storage) can be used as a page swap storage to swap pages in and out of the memory as needed by the program(s) being executed. Additionally, address translation can be used in multitasking environments to protect one tasks memory from access/update by another task, and to provide each task with its own address space independent of which physical pages are allocated to the task. If the overall memory usage of the tasks exceeds the memory size, page swapping can again be used to retain memory contents and provide access to the pages that are currently in use.

Page tables, which store the virtual to physical translation mappings, may include information to aid in the page swapping process. For example, reference bits and change bits are commonly included in the page table entries. The reference bit is set in a corresponding page table entry by the processor hardware when the page is referenced (e.g. either read or written). The change bit is set in the corresponding page table entry by the processor hardware if data in the page has been modified (e.g. via execution of a store instruction). The page management software may use the reference and change bits to determine which pages to page out to secondary storage. For example, the page management software may periodically clear the reference bits and may use the reference bits as an indicator of recent access. When a page is selected to be paged out, a page with the reference bit clear may be a good choice. If no pages have the reference bit clear, a page which has been referenced but not modified (change bit clear) may be a good choice since the page may not necessarily be written to the disk, since it can be read from its original source again when needed. If the change bit is set, the page may be paged out to disk and the changes retained.

Accordingly, the processor hardware generates updates to the page table entries. When software is modifying the page tables, or otherwise needs to ensure that pending page table entry updates have completed, software may use a predefined synchronization instruction that is defined to ensure that pending page table entry updates are complete. In multiprocessing environments, a synchronization operation is transmitted to each processor over the interconnect between the processors. Each processor ensures that its pending page table entry updates are completed before permitting the synchronization operation to complete. For example, in some cases, the processors retry the synchronization operation until the processors have completed the pending page table entry updates.

Typically, each processor in the system freezes the generation of page table entry updates and completes the pending page table entry updates. All processors then await the completion of the synchronization operation before unfreezing. Such a process correctly completes the pending page table entry updates, but also causes the processors to wait in the frozen state for a long period of time, in some cases.

SUMMARY

In one embodiment, a processor comprises a memory management unit (MMU) and an interface unit coupled to the MMU and to an interface unit of the processor. The MMU comprises a queue configured to store pending hardware-generated page table entry (PTE) updates. The interface unit is configured to receive a synchronization operation on the interface that is defined to cause the pending hardware-generated PTE updates, if any, to be written to memory. The MMU is configured to accept a subsequent hardware-generated PTE update generated subsequent to receiving the synchronization operation even if the synchronization operation has not completed on the interface. In some embodiments, the MMU may accept the subsequent PTE update responsive to transmitting the pending PTE updates from the queue. In other embodiments, the pending PTE updates may be identified in the queue and subsequent updates may be received.

In another embodiment, a method comprises receiving a synchronization operation from an interface into a processor. The synchronization operation is defined to cause pending hardware-generated PTE updates in the processor, if any, to be written to memory. The method further comprises permitting a subsequent hardware-generated PTE update generated subsequent to receiving the synchronization operation even if the synchronization operation has not completed on the interface.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Various instruction set architectures define different address translation mechanisms. Generally, a software-created data structure in memory is used to map virtual addresses to physical addresses at a defined granularity, referred to as a page. That is, all addresses within a given virtual page are translated to corresponding addresses in the physical page. Address bits that define offsets within the page are not translated. The page size may be fixed, may vary among a set of predefined page sizes, or may be programmably variable on a page-by-page basis in various embodiments. Any translation data structure that maps virtual addresses to physical addresses is referred to herein as a page table. The page table may comprise page table entries, where each page table entry defines a mapping for a page from virtual addresses to physical addresses. For example, the page table entry may include a virtual page number that is matched to a portion of the virtual address (e.g. excluding the page offset bits and bits used to index the page tables) and a real page number of the real page to which the virtual page is mapped. The page table entry may also include various attributes, including attributes that may be updated by hardware to indicate usage of the page in translating addresses (referred to as "usage attributes"). For example, the usage attributes may include a reference bit and a change bit, as mentioned above, although other embodiments may implement other usage attributes. The reference bit may be set by the processor hardware to indicate that the page has been accessed (either read or written). The change bit may be set to indicate that the page has been modified (e.g. at least one byte has been written due to the execution of a program that has access to the page, e.g. via a store instruction).

As mentioned previously, the reference and change bits may be set via hardware-generated page table entry (PTE) updates. Hardware-generated, in the context of PTE updates, may refer to generation by the processor hardware (e.g. memory management unit (MMU) hardware) rather than an explicit update included as an instruction in the software code loaded into memory and executed by the processor. The term hardware-generated may also include generation by microcode execution, where microcode may be a permanent part of the processor or may be loaded into the processor at boot via privileged operations. Hardware-generated PTE updates may refer to updates (that is, write operations) to PTE entries. A hardware-generated PTE update to the reference bit may also be referred to as a hardware-generated reference bit update, or just a reference bit update. A hardware-generated PTE update to the change bit may also be referred to as a hardware-generated change bit update, or just a change bit update.

Additionally, a processor may support receiving a synchronization operation from the interconnect to which it is coupled. Generally, the synchronization operation may include any operation transmitted on the interconnect that is defined to ensure that pending hardware-generated PTE updates have been completed. That is, when the synchronization operation completes successfully, the pending hardware-generated PTE updates have been completed. The synchronization operation may be generated by a processor, for example, in response to executing a synchronization instruction.

An example implementation will be described in more detail below for an embodiment of a processor that implements the PowerPC™ instruction set architecture. Exemplary instruction set architectures that may be implemented in other embodiments may include the ARM™ instruction set, the MIPS™ instruction set, the SPARC™ instruction set, the x86 instruction set (also referred to as IA-32), the IA-64 instruction set, etc. In the PowerPC instruction set architecture, the PTESYNC instruction may be an example of a synchronization instruction, and a PTESYNC operation transmitted on the processor interconnect in response to the PTESYNC instruction may be an example of a synchronization operation. The PTEs in the PowerPC instruction set architecture include the reference and change bits as the usage attributes. The PTESYNC instruction and operation are used as an example below, but any synchronization instruction and/or operation may be implemented in other embodiments.

Figure 1:
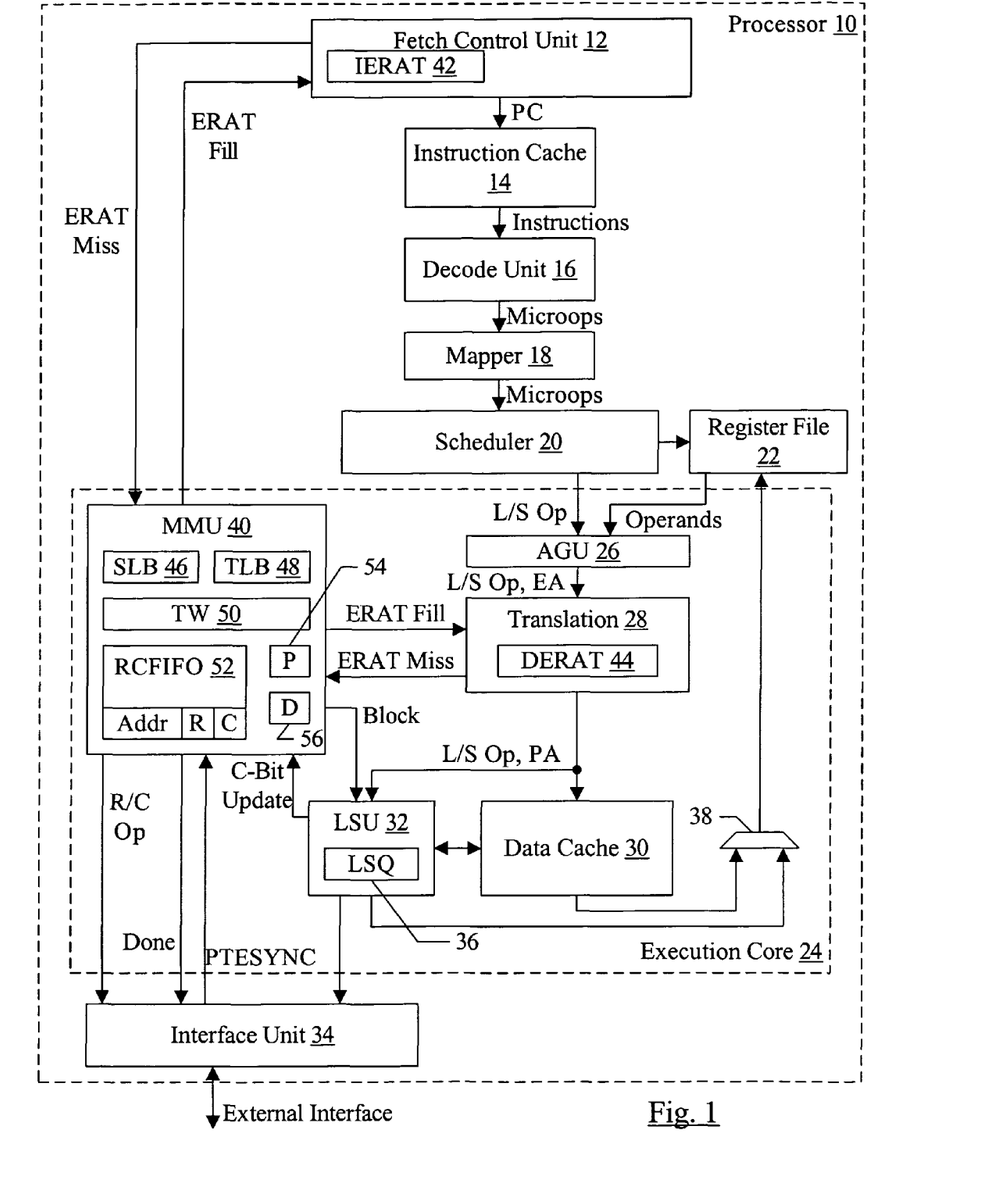
FIG. 1 is a block diagram of one embodiment of a processor.

Turning now to FIG. 1, a block diagram of one embodiment of a processor 10 is shown. In the illustrated embodiment, the processor 10 includes a fetch control unit 12, an instruction cache 14, a decode unit 16, a mapper 18, a scheduler 20, a register file 22, an execution core 24, and an interface unit 34. In the illustrated embodiment, the execution core 24 includes an address generation unit (AGU) 26, a translation unit 28, a data cache 30, a load/store unit 32 (which includes a load/store queue 36) and a memory management unit (MMU) 40. The fetch control unit 12 is coupled to provide a program counter (PC) for fetching from the instruction cache 14, and includes an instruction effective to real address translation table (IERAT) 42 to translate an effective PC to the real PC for fetching. The instruction cache 14 is coupled to provide instructions to the decode unit 16, which is coupled to provide microops to the mapper 18. The mapper 18 is coupled to provide microops to the scheduler 20 (along with register rename identifiers for the source operands and the destination operand). The scheduler 20 is coupled to the register file 22, and is coupled to provide load/store microops (L/S Op) for execution to the address generation unit 26. The register file 22 is coupled to provide operands to the address generation unit 26, and is coupled to receive results to be written to the register file 22 from a mux 38. The mux 38 is coupled to receive data from the data cache 30 and the LSU 32. The address generation unit 26 is configured to provide an effective address (EA) to the translation unit 28, along with the L/S op. The translation unit 28 is configured to provide a corresponding physical address (PA) along with the L/S op, to the data cache 30 for access, and also provides the information to the LSU 32. The translation unit 28 includes a data ERAT (DERAT) 44. The LSU 32 is coupled to the data cache 30 and the interface unit 34, which is further coupled to an external interface of the processor 10. The MMU 40 includes a segment lookaside buffer (SLB) 46, a translation lookaside buffer (TLB) 48, a table walker (TW) 50, a reference/change first-in, first-out (RCFIFO) 52, and various state including a pending (P) bit 54 and a done (D) bit 56. The MMU 40 is coupled to ERAT miss and ERAT fill interfaces to the fetch control unit 12 and the translation unit 28, and is further coupled to receive change bit (C bit) update requests from the LSU 32 and to provide a block signal to the LSU 32. The MMU 40 is coupled to provide reference/change update operations (R/C Op) and a done signal to the interface unit 34, and is coupled to receive a PTESYNC signal from the interface unit 34.

The MMU 40 may queue hardware-generated PTE updates in the RCFIFO 52. Generally, the RCFIFO 52 may be a queue, which may comprise any memory that may store one or more hardware-generated PTE updates until they may be transmitted to memory. For example, reference bit (R bit) updates may be generated by the MMU 40 itself, as a result of successfully completing a table walk in the page tables and locating a translation for a virtual address. Change bit (C bit) updates may be generated by the LSU 32 in response to committing a store operation if the corresponding page has a clear C bit. Committing the store operation may refer to making the store "globally visible". That is, a subsequent read of the memory location updated by the store returns the store data, regardless of the source of the read operation (e.g. another processor, an input/output (I/O) device, or the same processor that commits the store). The hardware-generate PTE updates may normally be a low priority operation to complete, and thus the updates may be transmitted to the interface unit 34 on cycles that the LSU 32 is not transmitting operations to the interface unit 34, in one embodiment. Transmission of the updates to the interface unit 34 is illustrated as the R/C Op in FIG. 1.

If the interface unit 34 receives a PTESYNC operation from the external interface (e.g. snoops the PTESYNC operation from the interface), the interface unit 34 may signal the MMU 40 via the PTESYNC signal. The MMU 40 may ensure that pending hardware-generated PTE updates, if any, in the RCFIFO 52 are transmitted to the external interface unit 34 for update to memory. A pending hardware-generated PTE update may be an update that is in the RCFIFO 52 at the time a given PTESYNC operation is first received from the external interface and signalled to the MMU 40. In some embodiments, the MMU 40 may ensure that the pending hardware-generated PTE updates have been transmitted on the external interface. In other embodiments, the interface unit 34 may ensure that the updates have been transmitted on the interface prior to permitting the PTESYNC operation to complete, and the MMU 40 may only ensure that the pending updates have been transmitted from the RCFIFO 52 to the interface unit 34. Once the pending updates have been transmitted, the MMU 40 may assert a done signal to the interface unit 34, informing the interface unit 34 that the PTESYNC operation may be completed, at least with respect to the contents of the RCFIFO 52.

The MMU 40 may effectively snapshot the contents of the RCFIFO 52 in response to the PTESYNC operation, determining the pending updates. The pending updates may be determined and tracked in any desired fashion. In the illustrated embodiment, the MMU 40 may block subsequent hardware-generated PTE updates until the pending updates have been transmitted. Thus, draining the RCFIFO 52 may indicate that the pending updates have been transmitted. The block signal in FIG. 1 may be asserted to the LSU 32, which may prevent committing stores that would cause a C bit update. In some embodiments, the LSU 32 may inhibit performing any memory operations responsive to assertion of the block signal. The MMU 40 may also ignore or reject ERAT misses from the fetch control unit 12 and the translation unit 28 until the pending updates have been transmitted. Other embodiments may identify and track the pending updates in other fashions. For example, a bit may be provided in each RCFIFO entry, and the bit may be set in valid entries responsive to receipt of the PTESYNC operation. In such embodiments, subsequent hardware-generated PTE updates may be permitted even before the pending updates have been transmitted, since the pending updates may be identified using the bit in each FIFO entry.

Once the pending updates have been transmitted, the MMU 40 may be configured to accept subsequent hardware-generated PTE updates, even if the PTESYNC operation has not yet completed on the external interface. Thus, if completion of the PTESYNC operation is delayed (e.g. due to another processor not having completed its pending updates), the processor 10 may continue operation as if the PTESYNC had completed. Performance may be increased, in some embodiments, by permitting the processor 10 to continue normal operation.

In one embodiment, the external interface may support a retry mechanism during the response phase of a transaction. PTESYNC operations may be retried to prevent their completion until the pending updates have been completed. Thus, a given PTESYNC operation may be performed on the external interconnect multiple times before completing. The MMU 40 may track the progress of a given PTESYNC operation using the P bit 54 and the D bit 56. The P bit may indicate that a PTESYNC operation is pending, and the D bit may indicate that the MMU 40 has completed processing of the PTESYNC operation and is permitting subsequent hardware-generated PTE updates to be queued in the RCFIFO 52. The interface unit 34 may retry the PTESYNC operation until the MMU 40 indicates that is has completed transmitting the pending PTE updates. That is, the interface unit 34 may retry the initial transmission of the PTESYNC operation if the are one or more pending PTE updates in the RCFIFO 52, and may retry subsequent transmissions of the PTESYNC operation if at least one pending PTE update remains in the RCFIFO 52. Once the PTESYNC operation completes successfully on the external interface (e.g. no agent retries the operation), the MMU 40 may clear the P and D bits and the next assertion of the PTESYNC signal (responsive to a different PTESYNC operation) may cause processing of the pending updates as described above. In other embodiments, delaying the completion of the PTESYNC operation may be performed in other fashions. For example, in packet-based interconnects, an acknowledgement packet may be used to acknowledge completion of the pending updates. The interface unit 34 may not transmit the acknowledgement packet until the MMU 40 transmits the pending updates. Another packet may be used by the source of the PTESYNC operation to signal successful completion of the PTESYNC operation (after receiving acknowledgement packets from each processor), and the receipt of the completion packet may be used to detect the successful completion of the PTESYNC operation.

An exemplary entry in the RCFIFO 52 is shown in FIG. 1. Other entries in the RCFIFO 52 may be similar. In the illustrated embodiment, the entry may include an address field (Addr in FIG. 1) storing the address of the PTE entry to be updated. Additionally, the entry includes an R field and a C field. Each field may be a bit, for example, indicating when set that the update is an R bit update (R bit set) or a C bit update (C bit set). Other embodiments may assign the opposite meanings to the set and clear states of the bits, or may use other indications. The entry may further include other information, as desired (e.g. a valid bit, bits to track the progress of the operation, etc.).

As mentioned above, the PTESYNC operation on the external interface may be the result of executing a PTESYNC instruction. The PTESYNC instruction may be executed by another processor on the external interface. Alternatively, the processor 10 may execute the PTESYNC instruction and transmit the PTESYNC operation on the external interface. In either case, in one embodiment, the operation of the MMU 40 may be based on receiving the PTESYNC operation from the external interface.

The MMU 40 also includes the SLB 46 and the TLB 48 in the illustrated embodiment, for caching translation results. In other embodiments, other translation caching structures may be used based on the implemented address translation mechanism. The SLB 46 may be a buffer of segment translations used to translate the effective address to the virtual address, in this embodiment. The TLB 48 may cache page translations from the page tables, translating virtual addresses to physical addresses on a page basis. Thus, processing an ERAT miss may include translating the effective address to a virtual address in the SLB 46, and translating the virtual address from the SLB 46 to a physical address in the TLB 48. In one embodiment, the SLB 46 is software managed (that is, a miss in the SLB causes an exception so that software may update the SLB 46, and instructions are defined for reading and writing the SLB 46). The TLB 48 may be hardware managed, in this embodiment. The table walker 50 may be configured to search the page tables for a translation responsive to a TLB miss. If a translation is successfully found, the table walker 50 may write the translation to the TLB 48 (and may generate an R bit update for the RCFIFO 52, if the R bit is clear in the translation). If a translation is not found, the table walker 50 may cause a page fault exception so that software may update the page tables in memory. The table walker 50 may be implemented in hardware, software, microcode, or a combination thereof, in various embodiments.

The fetch control unit 12 may comprise any circuitry used to generate PCs for fetching instructions. The fetch control unit 12 may include, for example, branch prediction hardware used to predict branch instructions and to fetch down the predicted path. The fetch control unit 12 may also be redirected (e.g. via misprediction, exception, interrupt, flush, etc.). The fetch control unit 12 may generate effective PCs, and may translate the effective PCs to physical PCs using the IERAT 42. The real PCs may be used to access the instruction cache 14. Particularly, the IERAT 42 in the present embodiment caches the results of translating an effective address through the segment mechanism (which includes the SLB 46) and the page table mechanism. If a PC misses in the IERAT 42 (that is, no translation is cached in the IERAT 42 for the effective PC), the fetch control unit 12 may transmit an ERAT miss request to the MMU 40. The ERAT miss request may include the effective PC that missed in the IERAT 42. The MMU 40 may respond with an ERAT fill, which may include the effective PC and the data cached in the IERAT 42 for the translation. The ERAT fill may further include signalling to indicate an exception, if the translation is not found by the MMU 40.

The instruction cache 14 may be a cache memory for storing instructions to be executed by the processor 10. The instruction cache 14 may have any capacity and construction (e.g. direct mapped, set associative, fully associative, etc.). The instruction cache 14 may have any cache line size. For example, 64 byte cache lines may be implemented in one embodiment. Other embodiments may use larger or smaller cache line sizes. In response to a given PC from the fetch control unit 12, the instruction cache 14 may output up to a maximum number of instructions. For example, up to 4 instructions may be output in one embodiment. Other embodiments may use more or fewer instructions as a maximum.

The decode unit 16 may generally be configured to generate microops for each instruction provided from the instruction cache 14. Microops may be an example of instruction operations Generally, an instruction operation may be an operation that the hardware included in the execution core 24 is capable of executing. Each instruction may translate to one or more instruction operations (e.g. microops) which, when executed, result in the performance of the operations defined for that instruction according to the instruction set architecture. The decode unit 16 may include any combination of circuitry and/or microcoding in order to generate microops for instructions. For example, relatively simple microop generations (e.g. one or two microops per instruction) may be handled in hardware while more extensive microop generations (e.g. more than three microops for an instruction) may be handled in microcode. The number of microops generated per instruction in hardware versus microcode may vary from embodiment to embodiment.

Microops generated by the decode unit 16 may be provided to the mapper 18. The mapper 18 may implement register renaming to map source register addresses from the microops to the renamed source registers. Additionally, mapper 18 may assign a scheduler entry to store each microop. In one embodiment, the scheduler entry number may also identify the rename register assigned to the destination of the microop. In other embodiments, the mapper 18 may assign a separate destination register number. The mapper 18 may also assign an LSQ entry in the LSQ 36 to load/store memory operations, in one embodiment. The mapper 18 may provide the microops, along with scheduler number, LSQ# (if applicable) and other rename information for each microop to scheduler 20. The scheduler 20 may store the microops in the scheduler entries identified by the respective scheduler numbers.

The scheduler 20 may schedule the microops for execution in the execution core 24. When a microop is scheduled, the scheduler 20 may read its source operands from the register file 22 and the source operands may be provided to the execution core 24. For load/store operations, the source operands include address operands used to generate the address of the memory location accessed by the load/store operation. Address operands of a load/store operation may include register operands provided from the register file 22 as well as displacement operands encoded in the load/store microop itself.

Load/store operations may be scheduled to the address generation unit 26, which generates the address of the load/store operation from the address operands. If address translation is enabled, the address generated by the address generation unit 26 may be an effective address, to be translated to a physical address through the address translation mechanism. In the illustrated embodiment, the translation unit 28 may perform the address translation, generating the physical address, through the DERAT 44. Similar to the discussion above, if the effective address of the load/store misses in the DERAT 44, the translation unit 28 may use an ERAT miss interface and ERAT fill interface to obtain the missing translation. In other embodiments, the translation mechanism may be included in the data cache 30.

The address from the translation unit 28 is provided to the data cache 30 and to the LSU 32. For load microops, the load data may be provided from either the data cache 30 or the LSU unit 32 through the mux 38. For example, the data may be provided by LSU 32 from the LSQ 36, if the load accesses bytes updated by a previous uncommitted store that is in the LSQ 36. The data may be provided from the data cache 30 if the load is a hit in the data cache 30 and the data is not provided from a previous uncommitted store in the LSQ 36. In some embodiments, a memory request buffer (not shown) in the interface unit 34 may be used as a store merge buffer for committed stores, and data may be forwarded from the memory request buffer as well.

For store operations, the LSU 32 may write the store address and store data to the LSQ entry identified by the LSQ# provided with the store operation. Load operations may also be written to the LSQ 36 (e.g. for ordering purposes or to await fill data in the event of a cache miss). The store operations may await non-speculative status in the LSQ 36, then may update the data cache 30 (for a cacheable store that is a cache hit), or may be transmitted to a memory request buffer in the interface unit 34 (not shown) used as a store merge buffer. For noncacheable stores, completing the store operation may include transmitting the store operation to the interface unit 34 to be transmitted on the external interface. Additionally, if the DERAT 44 indicates that the change (C) bit is not set for a store operation, the LSU 32 may generate a C bit update request to the MMU 40 when committing the store. The C bit update request may include the address of the PTE to be updated, and a signal indicating that the request is being transmitted.

In addition to maintaining the LSQ 36, the LSU 32 may have various other functions in some embodiments. For example, the LSU 32 may also enforce various load/store ordering rules, handle synchronization of memory operations as needed, participate in cache miss handling, etc. While a combined LSQ 36 has been described above, other embodiments may implement separate load and store queues.

The register file 22 may generally comprise any set of registers usable to store operands and results of microops executed in the processor 10. In some embodiments, the register file 22 may comprise a set of physical registers and the mapper 18 may map the logical registers to the physical registers. The logical registers may include both architected registers specified by the instruction set architecture implemented by the processor 10 and temporary registers that may be used as destinations of microops for temporary results (and sources of subsequent microops as well). In other embodiments, the register file 22 may comprise an architected register set containing the committed state of the logical registers and a speculative register set containing speculative register state.

The interface unit 24 may generally include the circuitry for interface the processor 10 to other devices on the external interface. The external interface may comprise any type of interconnect (e.g. bus, packet, etc.). The external interface may be an on-chip interconnect, if the processor 10 is integrated with one or more other components (e.g. a system on a chip configuration). The external interface may be on off-chip interconnect to external circuitry, if the processor 10 is not integrated with other components.

While the embodiment of FIG. 1 shows the execution core 24 including an address generation unit 26, a translation unit 28, a load/store unit 32, a data cache 30, and an MMU 40, other embodiments may include any desired components. For example, multiple address generation units, translation units, load/store units, data caches, and/or MMUs may be provided. Other units may be provided as well (e.g. one or more integer units, one or more floating point units, one or more graphics units, one or more cryptographic units, etc.). Generally, the execution core 24 may include any circuitry for executing instructions (or microops, in the illustrated embodiment).

It is noted that, while microop generation is implemented in the illustrated embodiment, other embodiments may not use microops and most instructions may be executed directly. Viewed in another way, there may be a one-to-one correspondence between instructions and instruction operations generated by the decode unit 16.

A store instruction may generally include any instruction defined in the instruction set architecture implemented by the processor that causes a store memory operation. Thus, store instructions may include instructions that implicitly specify a store. Store instructions may also include explicit store instructions. A store, store operation, or store memory operation may include an operation generated within the processor that is to be executed by the processor to perform a store (or part of a store). In some embodiments, the processor may generate one or more microops for each instruction defined in the instruction set architecture. In such embodiments, store microops may be generated. In other embodiments, microop generation may not be performed (e.g. most instructions in the instruction set architecture may be directly executed in the processor) and there may be a one-to-one correspondence between store instructions and store memory operations. A load instruction may similarly include any instruction defined in the instruction set architecture implemented by the processor that causes a load memory operation. A load, load operation, or load memory operation may include an operation generated within the processor that is to be executed by the processor to perform a load (or part of a load).

Turning now to FIGS. 2-5, flowcharts illustrating operation of one embodiment of various components of the processor 10 are shown. The blocks in each flowchart are shown in an order for ease of understanding. However, other orders may be used. Furthermore, blocks may be implemented in parallel in combinatorial logic in the components. Blocks, combinations of blocks, or the flowcharts as a whole may be pipelined over multiple clock cycles.

Figure 2:
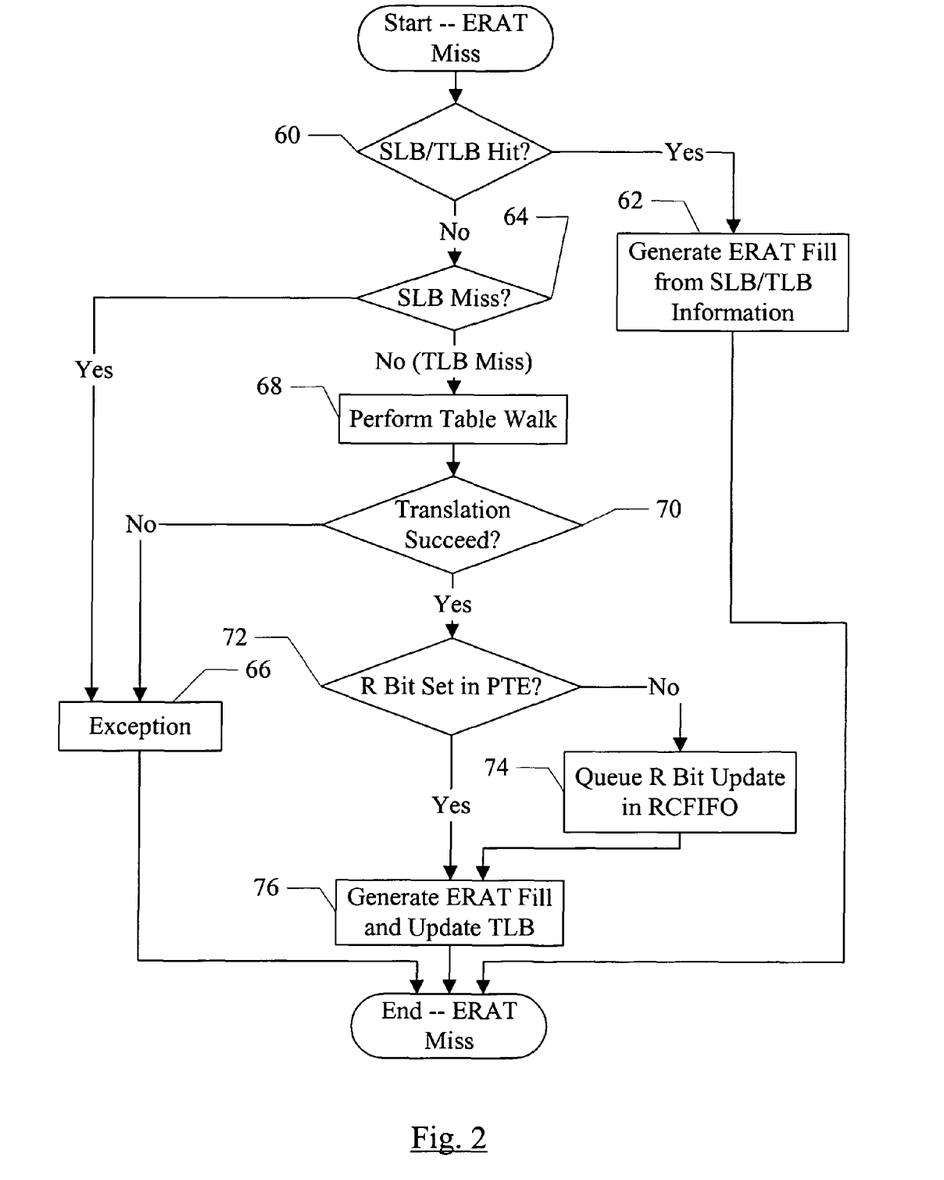
FIG. 2 is a flowchart illustrating operation of one embodiment of the processor in response to an effective to real address translation table (ERAT) miss.

FIG. 2 is a flowchart illustrating operation of one embodiment of the MMU 40 in response to an ERAT miss. Similar operation may be performed in response to an ERAT miss from either the fetch control unit 12 or the translation unit 28.

The MMU 40 may search the SLB 46 and the TLB 48 for a translation for the effective address in the ERAT miss. If a hit in both the SLB 48 and the TLB 48 is detected (decision block 60, "yes" leg), the MMU 40 may generate the ERAT fill from the translation information cached in the SLB 46 and the TLB 48 (block 62). The MMU 40 may transmit the ERAT fill to the fetch control unit 12 or the translation unit 28, whichever reported the ERAT miss.

If a miss is detected, further processing depends on whether the miss is in the SLB 46 or the TLB 48, in this embodiment. If the miss is in the SLB 46 (decision block 64, "yes" leg), the MMU 40 may generate an exception (block 66). The exception may permit software (which manages the SLB 46) to update the SLB 46 with information to translate the effective address to a virtual address. If the miss is not in the SLB 46 (decision block 64, "no" leg), the miss is in the TLB 48 and the table walker 50 may perform a table walk in the page tables in memory to attempt to locate a translation (block 68). Generally, the table walk may include reading various page table entries dependent on the virtual address, a base address of the page tables in memory, etc; processing the page table entries to determine if they store a translation of the virtual address to a physical address (e.g. comparing the virtual page number of the virtual address to the virtual page number in the entries); etc.

If the table walker 50 does not successfully locate a translation (decision block 70, "no" leg), the MMU 40 may signal a page fault exception (block 66). If a translation is successfully located (decision block 70, "yes" leg), the MMU 40 may check if the R bit in the page table entry that stores the translation is set (decision block 72). If the R bit is not set (decision block 72, "no" leg), the MMU 40 may queue an R bit update in the RCFIFO 52 for the page table entry (block 74). In either case, the MMU 40 may generate the ERAT fill (using the information from the SLB hit and the translation information) and may also update the TLB 48 with the translation (including setting the R bit, if needed) (block 76).

Figure 3:
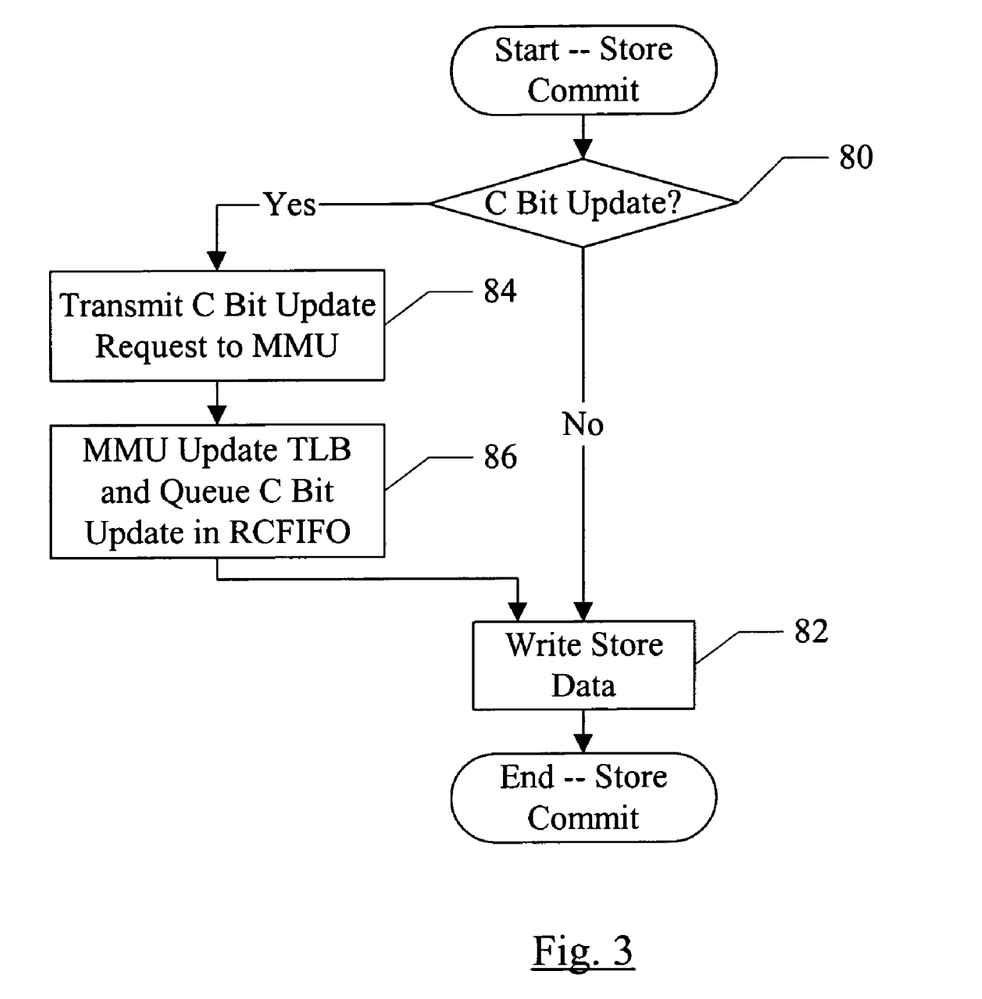
FIG. 3 is a flowchart illustrating operation of one embodiment of the processor in response to a store committing.

FIG. 3 is a flowchart illustrating operation of one embodiment of the LSU 32 and the MMU 40 in response to a store being selected to commit its store data. As mentioned previously, a store may be ready to commit its store data once it becomes non-speculative. The LSU 32 may await an opportunity to access the data cache 30 for the store, and other factors may also impact selection of the store to commit (e.g. preceding memory operations in the LSQ 36). Finally, if the block signal is asserted by the MMU 40, the LSU 32 may not select a store to commit data if the store also causes a C bit update.

If the information in the hitting entry of the DERAT 44 indicates that the C bit is set in the corresponding page table entry, no C bit update is needed (decision block 80, "no" leg) and the LSU 32 may write the store data to the data cache 30 or the interface unit 34 (block 82). If a C bit is update is needed (decision block 80, "yes" leg), the LSU 32 may generate a C bit update request to the MMU 40 (block 84). The request may include the address of the page table entry that is to be updated (e.g. the address may be provided from the DERAT 44) and may indicate at the C bit is to be updated. The MMU may update the TLB 48 to set the C bit in the corresponding TLB entry, and may queue the C bit update in the RCFIFO 52 (block 86). The LSU 32 may also write the store data (block 82).

Figure 4:
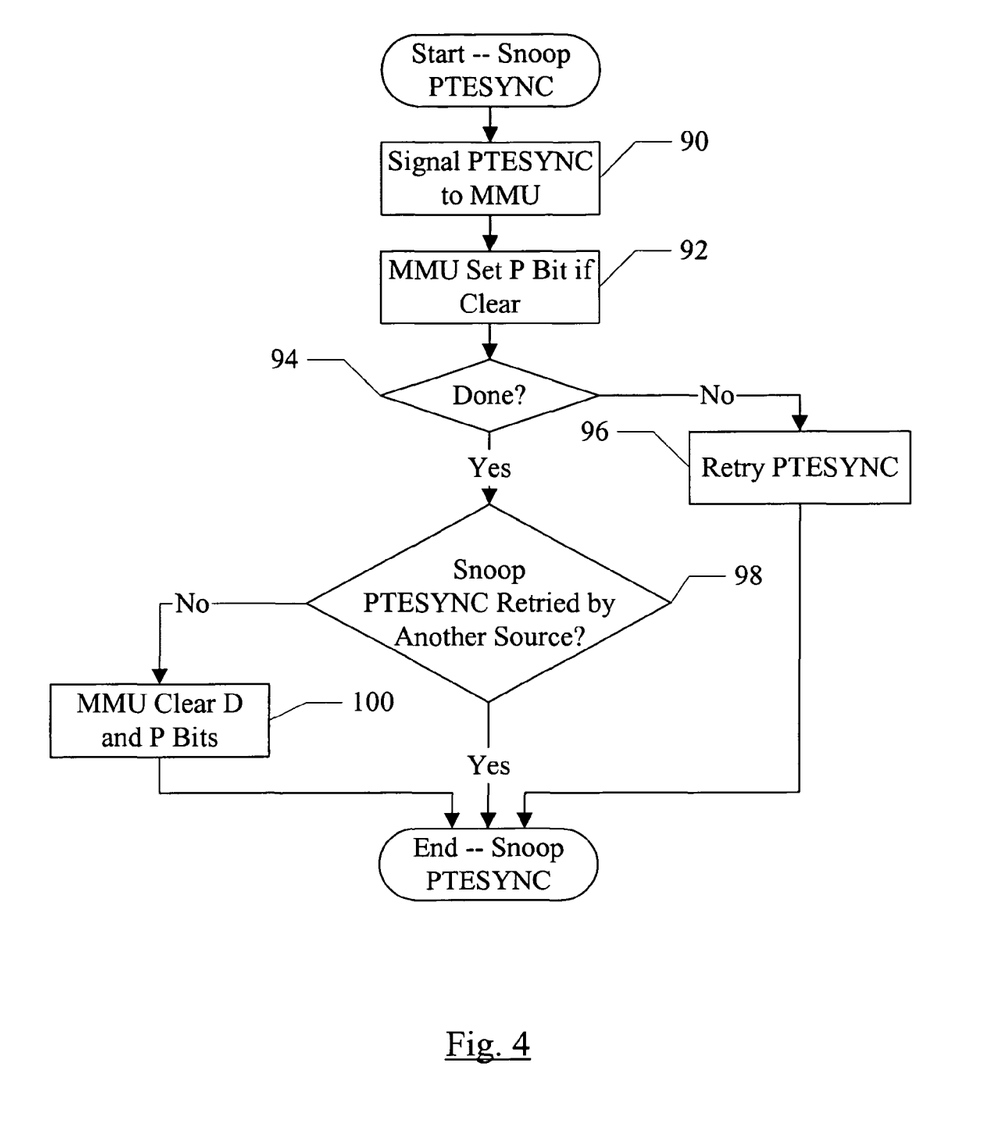
FIG. 4 is a flowchart illustrating operation of one embodiment of the processor in response to a PTESYNC on the interface.

FIG. 4 is a flowchart illustrating operation of one embodiment of the interface unit 34 and the MMU 40 in response to the interface unit 34 snooping a PTESYNC operation from the external interconnect. The interface unit 34 may signal that a PTESYNC operation has been received to the MMU 40 (block 90). In some embodiments, processors may be assigned into logical partitions, as defined in the PowerPC instruction set architecture. In such embodiments, a PTESYNC operation affects the processors in a logical partition identified in the PTESYNC operation, and the interface unit 34 may signal the PTESYNC operation if the processor 10 is in the identified logical partition. Responsive to the PTESYNC signal, the MMU 40 may set the P bit 54 (if not already set) (block 92).

The MMU 40 may signal done for the PTESYNC operation (decision block 94). For example, on the first time that the PTESYNC operation is transmitted, the MMU 40 may signal done if the RCFIFO 52 is empty. If the PTESYNC operation has previously been transmitted (the P bit 54 is set), the MMU 40 may signal done if the D bit 56 is set. Particularly, in one embodiment, the MMU 40 may continuously assert the done signal if the D bit 56 is set.

If the MMU 40 does not signal done (decision block 94, "no" leg), the interface unit 34 may retry the PTESYNC operation during its response phase (block 96). If the MMU 40 signals done (decision block 94, "yes" leg), the interface unit 34 may determine if the snooped PTESYNC operation is retried by another source (e.g. another processor) during the response phase. If the PTESYNC operation is not retried by any source (decision block 98, "no" leg), the MMU 40 may clear the D bit 56 and P bit 54, and the PTESYNC operation is complete (block 100). If the PTESYNC operation is retried by another source, the MMU may retain the done state (P and D bits set).

Figure 5:
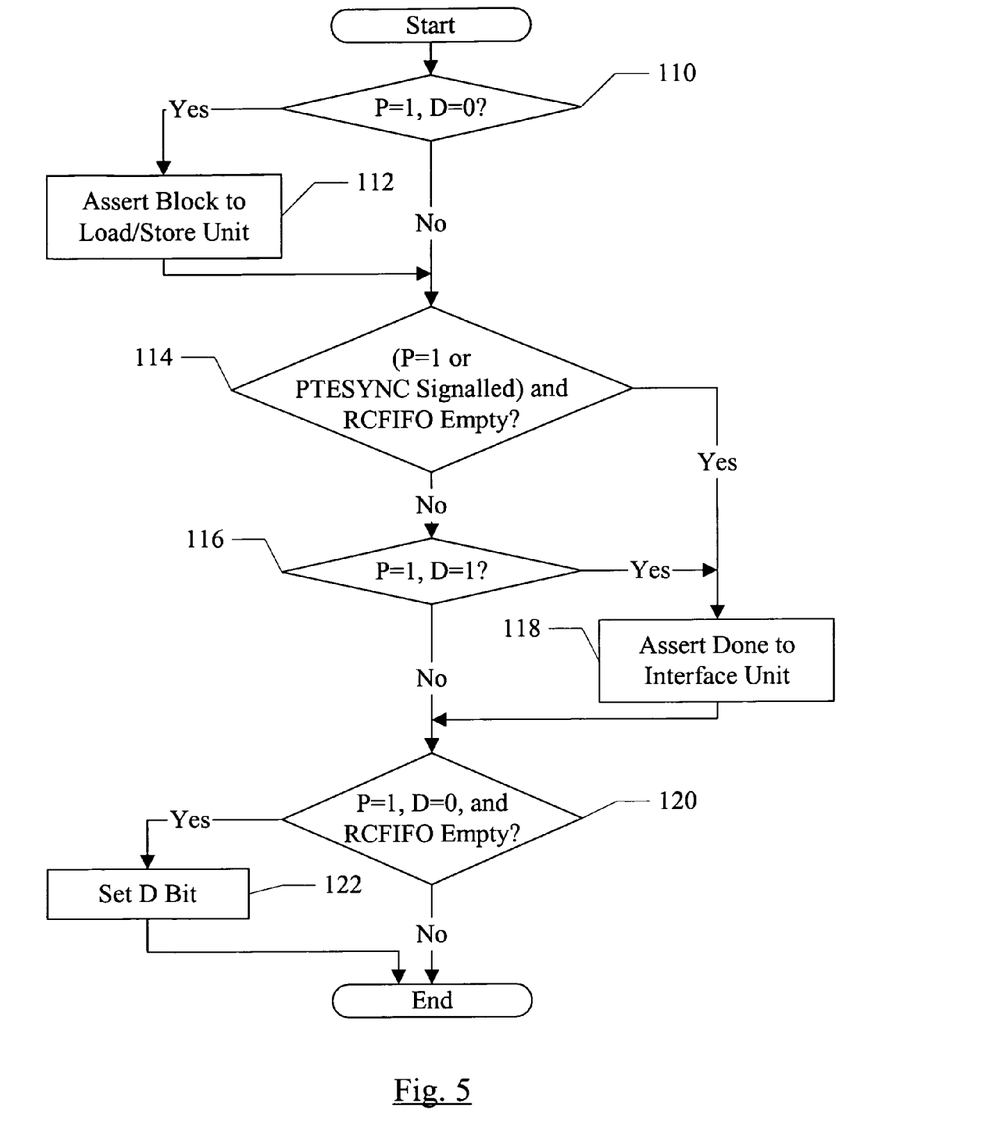
FIG. 5 is a flowchart illustrating certain operations of one embodiment of an MMU unit shown in FIG. 1.

FIG. 5 is a flowchart illustrating various operations of one embodiment of the MMU 40. The decision blocks 110, 114, 116, and 120 may be independent of each other, and may be performed in parallel by logic circuitry in the MMU 40.

If the P bit 54 is set and the D bit 56 is clear (decision block 110, "yes" leg), the MMU 40 may assert the block signal to the LSU 32 to prevent additional C bit update requests (block 112). The MMU 40 may also stall or reject ERAT miss requests from the fetch control unit 12 and the translation unit 28 in this state. Alternatively, one or both of these units 12 and 28 may receive the block signal and may inhibit ERAT miss requests in response to the assertion of the block signal.

If the P bit 54 is set, or a PTESYNC is signalled by the interface unit 34, and the RCFIFO 52 is empty (decision block 114, "yes" leg), or if the P bit 54 is set and the D bit 56 is set (decision block 116, "yes" leg), the MMU 40 may assert the done signal to the interface unit 34 (block 118). Thus, if both the P bit 54 and the D bit 46 are set, in this embodiment, the done signal may be asserted continuously.

If the P bit 54 is set, the D bit 56 is clear, and the RCFIFO 52 is empty (decision block 120, "yes" leg), the pending hardware-generated PTE updates have been transmitted. The MMU 40 may set the D bit 56 (block 122).

It is noted that, while a P bit 54 and D bit 56 are used as state to track the progress of a PTESYNC operation in this embodiment, other embodiments may use any state to track the progress.

Figure 6:
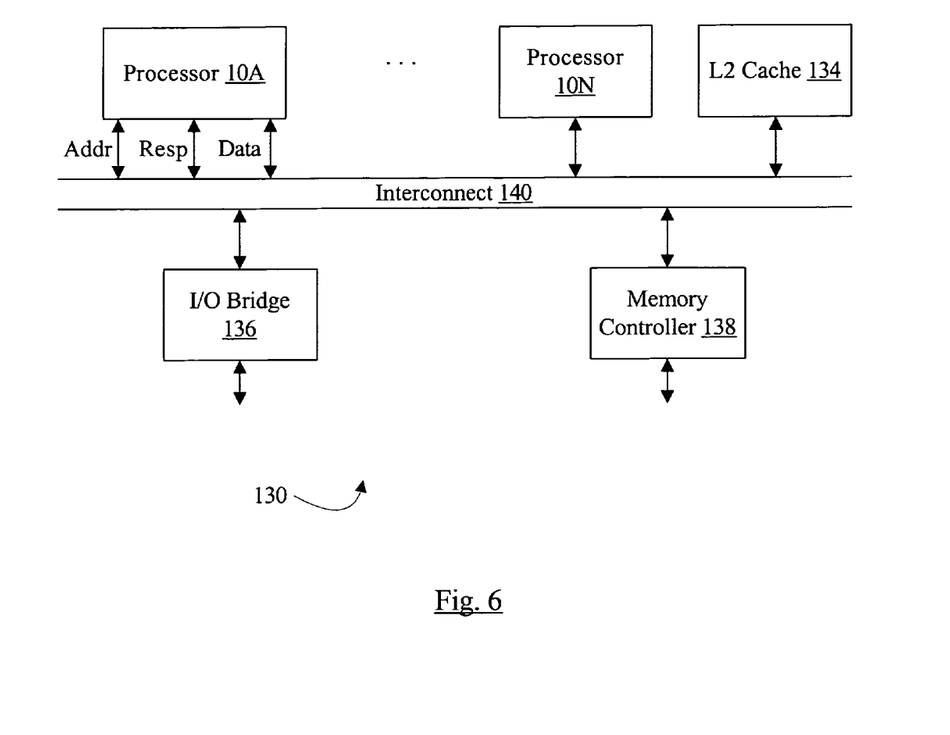
FIG. 6 is a block diagram of one embodiment of a system including two or more processors.

Turning now to FIG. 6, a block diagram of one embodiment of a system 130 is shown. In the illustrated embodiment, the system 130 includes processors 10A-10N, a level 2 (L2) cache 134, an I/O bridge 136, a memory controller 138, and an interconnect 140. The processors 10A-10N, the L2 cache 134, the I/O bridge 136, and the memory controller 138 are coupled to the interconnect 140. Any number of processors 10A-10N may be included in various embodiments. Similarly, other embodiments may include more than one L2 cache 134, more than one I/O bridge 136, and/or more than one memory controller 138. In one embodiment, the system 130 may be integrated onto a single integrated circuit chip (e.g. a system on a chip configuration). In other embodiments, the system 130 may comprise two or more integrated circuit components coupled together via a circuit board. Any level of integration may be implemented in various embodiments.

Each processor 10A-10N may be similar to the processor 10 shown in FIG. 1. Particularly, each processor 10A-10N may include an MMU 40, an interface unit 34, and an LSU 32 similar to the above discussion. The external interface referred to above with regard to the processor 10 may be the interconnect 140 shown in FIG. 6. Any of the processors 10A-10N may execute the PTESYNC instruction and may be the source of the PTESYNC operation on the interconnect 140. In one embodiment, only one processor 10A-10N may execute the PTESYNC instruction at a given point in time.

In the illustrated embodiment, cache coherent communication is supported on the interconnect 140 via the address, response, and data phases of transactions on the interconnect 140. Generally, a transaction is initiated by transmitting the address of the transaction in an address phase, along with a command indicating which transaction is being initiated and various other control information. Cache coherent agents on the interconnect 140 use the response phase to maintain cache coherency. Each coherent agent responds with an indication of the state of the cache block addressed by the address, and may also retry transactions for which a coherent response cannot be determined. Retried transactions are cancelled, and may be reattempted later by the initiating agent. The order of successful (non-retried) address phases on the interconnect 140 may establish the order of transactions for coherency purposes. The data for a transaction is transmitted in the data phase. Some transactions may not include a data phase. For example, some transactions may be used solely to establish a change in the coherency state of a cached block. Generally, the coherency state for a cache block may define the permissible operations that the caching agent may perform on the cache block (e.g. reads, writes, etc.). Common coherency state schemes include the modified, exclusive, shared, invalid (MESI) scheme, the MOESI scheme which includes an owned state in addition to the MESI states, and variations on these schemes.

The PTESYNC operation may be transmitted during the address phase on the interconnect 140, and may be retried in the response phase on the interconnect 140 by one or more processors 10A-10N that have pending hardware-generated PTE updates. The PTESYNC operation may have no data phase on the interconnect 140.

The interconnect 140 may have any structure. For example, the interconnect 140 may have separate address, response, and data interfaces to permit split transactions on the interconnect 140. The interconnect 140 may support separate address and data arbitration among the agents, permitting data phases of transactions to occur out of order with respect to the corresponding address phases. Other embodiments may have in-order data phases with respect to the corresponding address phase. In one implementation, the address phase may comprise an address packet that includes the address, command, and other control information. The address packet may be transmitted in one bus clock cycle, in one embodiment. In one particular implementation, the address interconnect may include a centralized arbiter/address switch to which each source agent (e.g. processors 10A-10N, L2 cache 134, and I/O bridge 136) may transmit address requests. The arbiter/address switch may arbitrate among the requests and drive the request from the arbitration winner onto the address interconnect. In one implementation, the data interconnect may comprise a limited crossbar in which data bus segments are selectively coupled to drive the data from data source to data sink.

The L2 cache 134 may be an external level 2 cache, where the data and instruction caches 14 and 30 are level 1 (L1) caches. In one implementation, the L2 cache 134 may be a victim cache for cache blocks evicted from the L1 caches. The L2 cache 134 may have any construction (e.g. direct mapped, set associative, etc.).

The I/O bridge 136 may be a bridge to various I/O devices or interfaces (not shown in FIG. 6). Generally, the I/O bridge 136 may be configured to receive transactions from the I/O devices or interfaces and to generate corresponding transactions on the interconnect 140. Similarly, the I/O bridge 136 may receive transactions on the interconnect 140 that are to be delivered to the I/O devices or interfaces, and may generate corresponding transactions to the I/O device/interface. In some embodiments, the I/O bridge 136 may also include direct memory access (DMA) functionality.

The memory controller 138 may be configured to manage a main memory system (not shown in FIG. 6). The memory in the main memory system may comprise any desired type of memory. For example, various types of dynamic random access memory (DRAM) such as synchronous DRAM (SDRAM), double data rate (DDR) SDRAM, etc. may form the main memory system. The processors 10A-10N may generally fetch instructions from the main memory system, and may operate on data stored in the main memory system. I/O devices may use the main memory system to communicate with the processors 10A-10N (e.g. via DMA operations or individual read/write transactions).

Numerous variations and modifications will become apparent to those skilled in the art once the above disclosure is fully appreciated. It is intended that the following claims be interpreted to embrace all such variations and modifications.

What is claimed is:

1. A processor comprising:
   circuitry that executes software instructions defined in an instruction set architecture implemented by the processor, including load/store operations, during use;
   a memory management unit (MMU) comprising a queue that stores pending hardware-generated page table entry (PTE) updates during use, wherein the PTEs are stored in a software-created page table in memory during use, and wherein the hardware-generated PTE updates are generated within the processor directly in response to the processor using the PTEs to translate addresses of the load/store operations to the pages mapped by the PTEs during use, and wherein the hardware-generated PTE updates modify one or more usage attributes in the PTE entry that identify use of the PTE entry by the processor without changing the translation defined by the PTE entry during use, and wherein the hardware-generated PTE updates are generated during translation operations during use; and
   an interface unit coupled to the MMU and to an external interface of the processor, wherein the processor communicates with other agents on the external interface during use, and wherein the interface unit receives a synchronization operation on the external interface from another agent on the external interface during use, wherein the synchronization operation is defined to cause the pending hardware-generated PTE updates in the queue, if any, to be written to memory, and wherein each hardware-generated PTE update includes an address phase, a response phase, and a data phase on the external interface, and wherein the address phase includes transmission of a command and a memory address of the PTE that is being updated by the hardware-generated PTE update, and wherein the response phase is used to ensure cache coherency, and wherein the data phase includes transmission of the one or more usage attributes being modified by the hardware-generated PTE update, and wherein a synchronization operation includes the address phase and the response phase but excludes the data phase on the external interface; and
   wherein the MMU accepts a subsequent hardware-generated PTE update into the queue as a new pending hardware-generated PTE update during use, wherein the subsequent hardware-generated PTE update is generated subsequent to receiving the synchronization operation and prior to the synchronization operation completing on the interface during use.

2. The processor as recited in claim 1 wherein the interface unit retries the synchronization operation, during use, on the external interface responsive to at least one pending hardware-generated PTE update being in the queue that was in the queue prior to receiving the synchronization operation during use.

3. The processor as recited in claim 2 wherein the interface unit retries subsequent transmissions of the synchronization operation, during use, on the on the external interface responsive to the at least one pending hardware-generated PTE update remaining in the queue during use.

4. The processor as recited in claim 3 wherein, responsive to no pending hardware-generated PTE updates remaining in the queue that were in the queue prior to receiving the synchronization operation during use, the MMU records a done state for the synchronization operation during use, and wherein the interface unit does not to retry a next transmission of the synchronization operation responsive to the done state during use, and wherein the MMU accepts the subsequent hardware-generated PTE update into the queue, during use, as the new pending hardware-generated PTE update responsive to the recorded done state.

5. The processor as recited in claim 4 wherein, responsive to the next transmission of the synchronization operation being retried by another source, the MMU retains the done state during use.

6. The processor as recited in claim 5 wherein, responsive to the next transmission of the synchronization operation not being retried by another source during use, the MMU clears the done state during use.

7. The processor as recited in claim 1 wherein the hardware-generated PTE updates comprise one or more change bit updates, and wherein the change bit is one of the usage attributes.

8. The processor as recited in claim 7 wherein the circuitry comprises a load/store unit coupled to the MMU, wherein the load/store unit generates a change bit update, during use, responsive to committing a store operation that uses a PTE for which the change bit is clear.

9. The processor as recited in claim 8 wherein the MMU inhibits reception of the subsequent hardware-generated PTE update into the queue, during use, responsive to the synchronization operation until the pending hardware-generated PTE updates have been transmitted on the external interface during use.

10. The processor as recited in claim 9 wherein the MMU blocks operation of the load/store unit, during use, to inhibit the subsequent hardware-generated PTE update.

11. The processor as recited in claim 7 wherein the hardware-generated PTE updates comprise one or more reference bit updates generated by the MMU, during use, responsive to a table walk of the page table in response to a translation lookaside buffer miss, and wherein the reference bit is another one of the usage attributes.

12. The processor as recited in claim 1 wherein the MMU accepts the subsequent hardware-generated PTE update, during use, responsive to transmitting each pending hardware-generated PTE update from the queue during use.

13. A method comprising:
executing software instructions in a processor, the executing including executing load/store operations;
writing one or more hardware-generated page table entry (PTE) updates to a queue in a processor, the one or more hardware-generated PTE updates pending in the queue, wherein the hardware-generated PTE updates are generated within the processor directly in response to the processor using the PTEs to translate addresses of the load/store operations to the pages mapped by the PTEs, and wherein the hardware-generated PTE updates modify one or more usage attributes in the PTE entry that identify use of the PTE entry by the processor without changing the translation defined by the PTE entry, and wherein the hardware-generated PTE updates are generated during translation operations;
receiving a synchronization operation into the processor from another agent on an external interface, wherein the processor communicates with other agents on the external interface, and wherein the synchronization operation is defined to cause the pending hardware-generated PTE updates in the processor, if any, to be written to memory, and wherein each hardware-generated PTE update includes an address phase, a response phase, and a data phase on the external interface, and wherein the address phase includes transmission of a command and a memory address of the PTE that is being updated by the hardware-generated PTE update, and wherein the response phase is used to ensure cache coherency, and wherein the data phase includes transmission of the one or more usage attributes being modified by the hardware-generated PTE update, and wherein a synchronization operation includes the address phase and the response phase but excludes the data phase on the external interface, and wherein the PTEs are stored in a software-created page table in memory; and
permitting a subsequent hardware-generated PTE update to be written into the queue as a new pending hardware-generated PTE update, wherein the subsequent hardware-generated PTE update is generated subsequent to receiving the synchronization operation and prior to the synchronization operation completing on the interface.

14. The method as recited in claim 13 further comprising retrying the synchronization operation on the external interface responsive to at least one pending hardware-generated PTE update that was in the queue prior to receiving the synchronization operation.

15. The method as recited in claim 14 further comprising retrying subsequent transmissions of the synchronization operation on the external interface responsive to the at least one pending hardware-generated PTE update remaining pending.

16. The method as recited in claim 15 further comprising, responsive to no pending hardware-generated PTE updates that were in the queue prior to receiving the synchronization operation, not retrying a next transmission of the synchronization operation.

17. The method as recited in claim 13 wherein the hardware-generated PTE updates comprise one or more change bit updates, and wherein the change bit is one of the usage attributes, and the method further comprising generating a change bit update responsive to committing a store operation that uses a PTE for which the change bit is clear.

18. The method as recited in claim 17 further comprising inhibiting reception of the subsequent hardware-generated PTE update into the queue responsive to the synchronization operation until the pending hardware-generated PTE updates have been transmitted on the external interface.

19. The method as recited in claim 18 wherein the inhibiting comprises blocking a load/store unit configured to perform the store operation.

20. The method as recited in claim 17 wherein the hardware-generated PTE updates comprise one or more reference bit updates generated responsive to a table walk of the page table in response to a translation lookaside buffer miss, and wherein the reference bit is another one of the usage attributes.

21. The method as recited in claim 13 wherein permitting the subsequent hardware-generated PTE is responsive to transmitting each pending hardware-generated PTE update.

* * * * *

UNITED STATES PATENT AND TRADEMARK OFFICE
CERTIFICATE OF CORRECTION

PATENT NO. : 7,739,476 B2  Page 1 of 1
APPLICATION NO. : 11/267711
DATED : June 15, 2010
INVENTOR(S) : Jesse Pan et al.

It is certified that error appears in the above-identified patent and that said Letters Patent is hereby corrected as shown below:

In column 6, line 29, delete "the are" and insert -- there are --.

In column 14, line 59, in Claim 3, before "external" delete "on the".

In column 16, line 59, in Claim 21, after "PTE" insert -- update --.

Signed and Sealed this
Eighth Day of November, 2011

David J. Kappos
*Director of the United States Patent and Trademark Office*